No. 12,519.
REISSUED AUG. 7, 1906.
H. L. HARTENSTEIN.
MANUFACTURE OF CARBID.
APPLICATION FILED MAY 10, 1906.
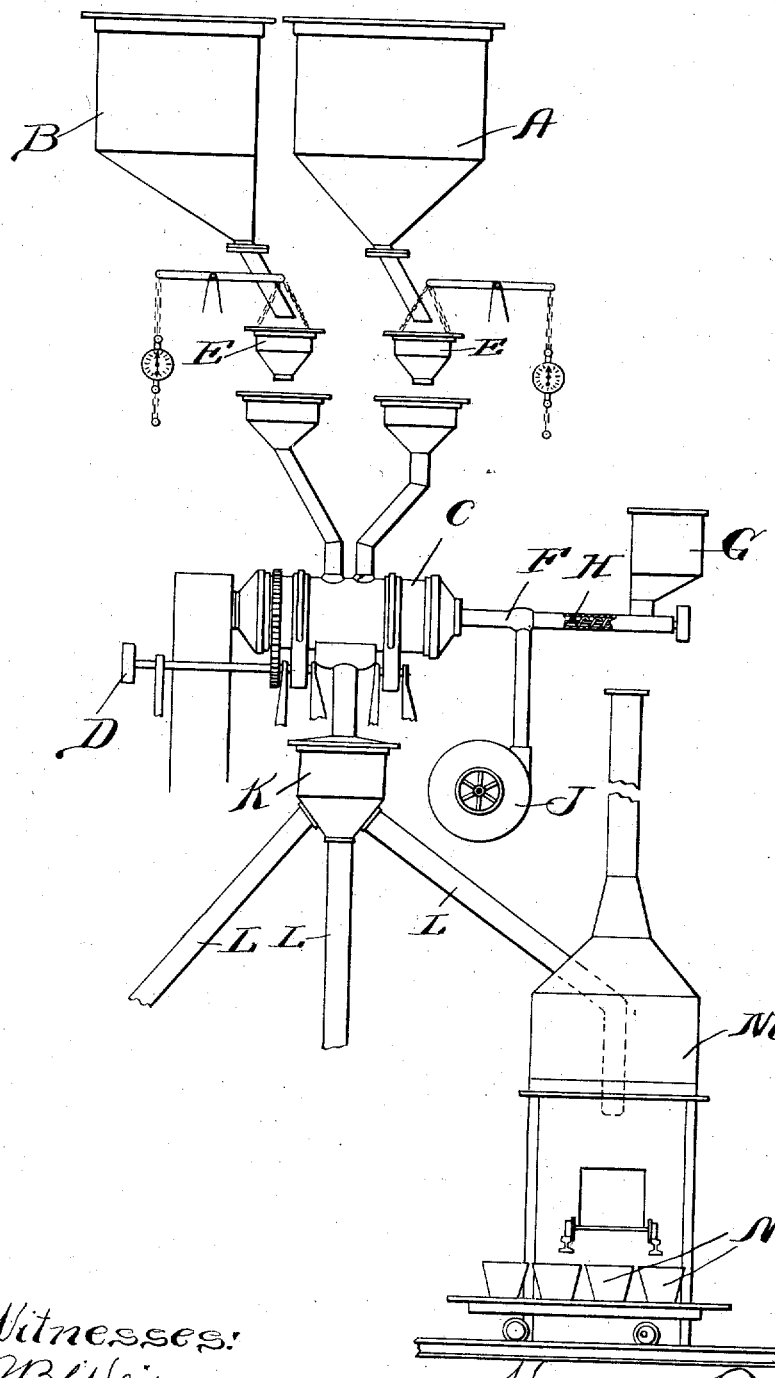
Witnesses:
J. B. Weir
W. P. Kilroy
Inventor
Herman L. Hartenstein
by Brown Darby & Colpitts
Attys.

UNITED STATES PATENT OFFICE.

HERMAN L. HARTENSTEIN, OF CONSTANTINE, MICHIGAN, ASSIGNOR, BY MESNE ASSIGNMENTS, TO ELECTRO CHEMICAL & DEVELOPMENT COMPANY, OF PIERRE, SOUTH DAKOTA, A CORPORATION OF SOUTH DAKOTA.

MANUFACTURE OF CARBID.

No. 12,519. Specification of Reissued Letters Patent. Reissued Aug. 7, 1906.

Original No. 819,222, dated May 1, 1906. Application for reissue filed May 10, 1906. Serial No. 316,223.

*To all whom it may concern:*

Be it known that I, HERMAN L. HARTENSTEIN, a citizen of the United States, residing at Constantine, in the county of St. Joseph and State of Michigan, have invented a new and useful Manufacture of Carbid, of which the following is a specification.

This invention relates to the manufacture of carbid.

The object of the invention is to produce carbid of a superior quality for commercial purposes and in a most simple, efficient, and economical manner.

The invention consists, substantially, in the method of operation and procedure hereinafter set forth, and as illustrated in the accompanying drawing.

The single view of the accompanying drawing illustrates an apparatus adapted to the carrying out of my invention.

According to the ordinary methods such as are commonly practiced in the manufacture of carbid for commercial purposes, lime is mixed with carbonaceous material, such as coke, and the mixture is fused or melted in an electric or other furnace and at a high degree of temperature, the molten mass being usually permitted to cool in the furnace and the cooled product finally removed, broken up or crushed, packed, shipped, or used for use in the manufacture of acetylene gas or for other purposes. This method of operation is objectionable in many respects and results in the production of an inferior grade or quality of finished product or carbid.

It is among the purposes of my invention to simplify and improve the method of manufacturing carbid, to avoid the waste and crudeness of former methods, to utilize in the most economical manner the natural advantages of a direct and continuous method of treatment and operation, and to take every possible advantage of the condition in which the material is placed by each step of the process in the succeeding steps of operation.

In carrying out my invention I propose to employ limestone rather than lime, although in this respect I do not desire to be limited, as my invention contemplates many other advantages, even when lime is used; but in the usual method of burning lime limestone in lumps or in pieces of various sizes is used, being charged into kilns with alternate layers of fuel, and if the charges are uneven or too large the combustion is not perfect, hence resulting in imperfect burning of the stone, and consequently resulting in an inferior quality of lime, at least for the purpose of manufacturing carbid. Moreover, limestone in large and irregular-sized pieces causes loss of time in addition to being imperfectly burned, thereby necessitating a sorting of the stone and running of kiln for a time on one size and then for a time on another size, for if there is any very great variation in the size of pieces or lumps of stone being burned the time required to burn the larger-sized pieces is lost for whatever percentage of small stones or pieces that may be present, besides involving an increased cost in the burning operation, as well as a waste of time and fuel. Moreover, lime is frequently produced crudely in imperfect or temporary kilns of various constructions, and consequently is not of the superior quality desired or desirable for carbid manufacture, and in some forms of kilns employed the limestone comes in contact with the fuel employed in the burning operation, and the resulting lime is injured by the ashes, frequently causing clinkers. In some forms of kilns gas is employed as the heating medium; but such kilns are usually of small capacity, inasmuch as the flame of the gas penetrates only a small distance through the mass of stone being burned. Moreover, it usually requires many days' burning to reduce the limestone to the proper condition, and after the burning operation is completed the lime is permitted to cool down without in any way utilizing the heat required during the burning operation, and this is particularly true where the lime after being produced is transported to the point of location of the plant in which carbid is manufactured. Again, when lime is employed in the manufacture of carbid the lime is crushed and pulverized at the carbid plant previous to the operation of conversion, besides requiring handling, and owing to its caustic qualities it is very injurious to the life and health of the workmen, as well as to near-by vegetation. Moreover, as is well known, lime readily absorbs moisture and carbonic acid, and when unduly exposed, as is frequently the case in the transportation and handling thereof, it causes objectionable irregularities in the electric or other furnace in which the conversion is effected— as, for instance, the blowing resulting from the escape of carbonic-acid gas or carbon dioxid, thereby wasting coke, as well as the lime, and also frequently clogging and hanging up the furnace charge. Again, in the ordinary method of manufacturing carbid the lime is usually mixed with the carbonaceous material in the cold, thereby necessitating mixing machinery, as well as the labor and handling of the materials, and also a very heavy electric current for effecting the fusing or melting operation, which is an expensive part of the operation. For these and other reasons which might be recited I prefer to employ limestone direct instead of lime in carrying my invention into practical operation, although, as above stated, I do not desire to be limited or restricted in this respect.

In carrying out my invention I propose to calcine pulverized limestone and then to heat the same to incandescence in the presence of carbonaceous material—such, for instance, and, preferably, as pulverized coke, although other carbon-containing substances may answer the purpose. I therefore do not desire to be limited or restricted in this respect.

Generally speaking, and in its broadest terms, my invention may be said to consist in crushing or pulverizing limestone, then heating the same to the point of incandescence, and then while in its heated condition supplying the charge to an electric or other furnace in association with a carbonaceous substance, where the mass is heated to the melting-point to effect the desired conversion into carbid, and finally tapping or running off the molten mass into molds or otherwise, when the product is ready to be broken up, crushed, packed, shipped, or used for commercial purposes. After the charge of mixed limestone and carbonaceous substance has been sufficiently heated to expel the gases from the materials the heated charge may be delivered into a vat, reservoir, tank, or other suitable receptacle, from which said heated charge may be delivered to one or more electric or other furnaces to be converted into carbid. In this manner I utilize as much as possible the heat units required in the preheating operation in raising and maintaining the temperature of the mass as delivered into the electric or other furnaces, thereby requiring less current in case of an electric furnace to effect the conversion of the mass into carbid. If desired and preferably, I supply to the mass during the preheating operation a small portion of carbid dust or "fines," which is not suitable or desired for other use, in order to thoroughly expel and drive off any remaining carbon monoxid and carbon dioxid. The carbid dust or fines thus supplied during the preheating operation by means of the oxygen contained therein forms a superheating compound, and thereby serves to increase the temperature of the mass and to enable the mass to retain its heat when delivered into the distributing vat, reservoir, or tank. I also attain the same object by adding a superheating compound to the heated mass during or immediately preceding the delivery of such mass into the distributing tank or vat. I have found that a composition composed of calcium carbid sixty per cent., (60 %,) black oxid of manganese, twenty per cent., (20 %,) bituminous coal, fifteen per cent., (15 %,) chlorate of potash, two per cent., (2 %,) aluminium, three per cent., (3 %,) answers the purpose of a superheating compound for my purpose. I do not desire, however, to be limited to any specific superheating composition or compound, as possibly other substances or compositions and other proportions of ingredients might equally well serve the desired purpose. The substances mentioned and the proportions set forth I have found to be efficient and satisfactory.

In the accompanying drawing I have illustrated an arrangement of apparatus adapted to the carrying out of the principles of my invention; but I desire it to be understood that my invention as herein claimed does not reside in the form of mechanism employed, the particular form shown being merely illustrative of an operative embodiment of apparatus capable of performing my invention.

Reference-sign A designates a suitable hopper or bin adapted to receive the limestone after being crushed and pulverized to the desired degree of fineness. I have found that limestone crushed to about twenty mesh well answers my purpose; but my invention is not to be limited or restricted in this respect, as other degrees of fineness or coarseness might be employed. Reference-sign B designates a similar tank adapted to receive carbonaceous material in a finely-divided state—as, for instance, crushed or pulverized coke. I have found coke desirable for my purposes, although it is obvious that other carbonaceous or carbon-containing substances may equally well answer—such, for instance, as charcoal, coal, lampblack, or the like. I have also found that the best results are obtained when the coke or carbonaceous substance is ground or pulverized to about fifty mesh or finer, though I do not desire to be limited in this respect.

C designates the preheating-furnace. This furnace may be of any suitable, convenient, or ordinary construction. In the form illustrated this comprises a rotary drum or cylinder adapted to receive rotation in any suitable or convenient manner—as, for instance, from the drive-pulley D through suitably-arranged gearing. The charges of pulverized limestone and carbonaceous material are delivered into the furnace C in any suitable or convenient manner. Preferably and in the most economical arrangement the bins A B are arranged over the furnace, and the charges are delivered or fed therefrom into the furnace C by gravity. If desired, the charges may be weighed—as, for instance, by means of the automatic dumping-scales E or otherwise—previous to the introduction thereof into the furnace. Where a rotary drum is employed as a preheating-furnace, said drum may be rotated within a stationary sleeve, which sleeve communicates with the interior of the heating-drum and with which sleeve connects suitable receiving and delivery spouts for the material to be treated. The preheating-furnace C may be heated in any suitable or convenient manner—as, for instance, by means of a burner F, arranged to deliver into said furnace coal-dust or fine particles of coal, and an air-blast, the fuel-coal being supplied in any suitable manner from a conveniently-arranged bin G—as, for instance, by a suitably-arranged conveyer H—and the air-blast being supplied in any convenient manner—as, for instance, from a blower J. From the preheating-furnace C the mass of material when raised to the desired degree of temperature is delivered into a distributing vat or tank K, from which such mass is delivered in a heated condition through one or more pipes L to the electric or other furnaces (indicated at M) for the conversion into carbid, the number of electric or other furnaces M depending upon the capacity of the plant, and the most economical arrangement is shown, wherein the preheating-furnace C is located above the distributing vat or tank K, and the latter is located above the electric or other furnaces. In this manner the heated charge from the preheating-furnace may be delivered by gravity into the distributing tank or reservoir and thence by gravity into the electric or other furnaces, thereby avoiding the handling of the material and at the same time enabling advantage to be taken at each step of the operation of the condition in which the material is left by the preceding step of the operation. In other words, the heat required to calcine the limestone in the preheating step of the process is practically all retained in the material, and particularly where a superheating substance, agent, or compound is employed in the manner above set forth, until such material is delivered into and is acted upon in the electric or other furnace to effect the final step of conversion. After the material has been reduced to molten condition in the electric or other furnace M it is tapped or run off or otherwise delivered into molds or other suitable receptacles, and the process, so far as the production of carbid is concerned, is completed.

The operation is as follows: The preheating-furnace C is first heated to a high degree of temperature—say 1,500° to 2,000° Fahrenheit—from the burner F. A charge of limestone, pulverized or granulated to the desired degree of fineness, is then delivered into the preheating-furnace C after being weighed, if desired. This charge is then agitated in any suitable manner—as, for instance, in the case of a rotary furnace, by imparting a slow rotation thereto—and the temperature within the furnace increased until the charge is raised to the temperature of incandescence or thereabout. During this heating operation the carbonic-acid gas and other gases are driven off, and by agitating the charge—as, for instance, by rotating the heater or furnace—every particle of stone is acted upon by the heat. This operation requires a comparatively short time, and the degree of temperature maintained may be readily indicated by a pyrometer, and it may also be determined when the gas has been sufficiently expelled—as, for instance, by means of an ordinary gas-composometer. When this operation has been carried on to the desired extent, the charge of pulverized or granulated carbonaceous material is delivered into the furnace and the agitation of the contents of the furnace continued—as, for instance, by rapidly rotating the same in case of a rotary furnace—thereby thoroughly mixing the carbon element with the heated limestone. In practice I employ limestone and coke in about the proportion of three parts, by weight, of the stone to one part, by weight, of the carbonaceous material. This proportion, however, may be varied without departure from the scope of my invention.

Sometimes a small percentage or phosphorus is present in limestone or lime, and which phosphorus is retained in the finished carbid. The presence of phosphorus in carbid is exceedingly objectionable on account of its inflammability and the danger of starting spontaneous combustion therefrom. In accordance with my invention, as above explained, the aluminium constituent of the superheating flux serves to drive off or expel any phosphorus that may be present in the mass under treatment. The proportion of superheating flux employed may be varied throughout a wide range and dependent upon the character or quality of limestone or lime-bearing ore or substance employed. Under ordinary conditions I have found the proportion of from fifteen to twenty pounds of superheating flux per ton of material treated satisfactorily answers the desired purpose. The operation is as follows: The limestone or lime-containing ore or substance (and preferably in a pulverized or granular condition) and also the carbonaceous material—such, for instance, as coke or the like (also preferably crushed or pulverized)—are placed in the receiving-bins. The preheating-furnace is then heated up to from 1,500° to 2,000° temperature. A charge of the crushed or pulverized limestone is then delivered into the heated furnace, being previously weighed, if desired, in the automatic scales. The mass in the preheating-furnace is then suitably agitated—as, for instance, by slowly rotating the furnace in case a rotary furnace is employed—and the temperature thereof increased by properly regulating the supply of coal and air through the burner or otherwise to an extent such as to bring the limestone to incandescence. The charge of powdered carbonaceous material, previously weighed, if desired, is then introduced into the preheating-furnace and thoroughly mixed with the incandescent lime in the presence of a very high degree of heat. The superheating compound is then added to the mass, and immediately thereafter the mass is dumped or delivered into the distributing tank or vat. If desired, the superheating compound may be supplied during the delivery of the heated mass into the distributing-tank, or the superheating compound may be placed in the distributing tank or vat and the heated mass delivered therein. This compound or flux not only serves to retain the high degree of heat of the mass while contained in the distributing tank or vat, so that the mass is distributed into the electric or other furnaces at a high temperature, but also this compound or flux tends to drive off or expel any phosphorus that may be present. The heated mass, and while still in a highly-heated condition, is distributed through the distributing vat or tank to the various electric or other furnaces, in which the mass is subjected to the action of an electric current or otherwise heated to the fusing or melting point, and the melted mass or carbid is then run off into molds or sheets or otherwise and is ready to be broken up, crushed, packed, shipped, or used.

From the foregoing description it will be seen that I provide an exceedingly simple, economical, and efficient process for the manufacture of carbid wherein the carbid is produced direct from limestone without the necessity of waste of time, labor, and expense of first burning the limestone according to the usual methods to produce lime. It will also be seen that I take advantage of the condition and temperature of the material under treatment, in which such material is left by each step of the process in carrying out the next successive step of the operation For instance, the heat developed during the calcining and mixing operations is retained in the mass until the mass is distributed to the electric or other fusing or melting furnaces, thereby requiring less current and involving less expense to effect the final step of melting or conversion into carbid. It will also be seen that I am enabled to produce a superior quality of carbid and a product free from the presence of phosphorus, and the cost of manufacturing the finished product or carbid is vastly reduced.

I do not claim herein the superheating compound or composition of matter employed, as the same forms the subject-matter of a copending application executed of even date herewith, Serial No. 116,665.

Having now set forth the object and nature of my invention and the manner of carrying the same into practical operation, what I claim as new and useful and of my own invention, and desire to secure by Letters Patent, is—

1. In the manufacture of carbid from limestone and carbonaceous material, the herein-described process which consists in calcining the limestone to produce lime before the carbonaceous material is added, then mixing with such resultant lime before it cools to atmospheric temperature, the proportion of carbonaceous material, and finally, while the mixture is still heated above atmospheric temperature, subjecting it to a fusing degree of heat, excluded from oxygen.

2. In the manufacture of carbid from limestone and carbonaceous material, the herein-described process which consists in calcining pulverized limestone to produce pulverized lime before the carbonaceous material is added, then mixing with such resultant lime before it cools to atmospheric temperature the proportion of carbonaceous material, and finally, while the mixture is still heated above atmospheric temperature, subjecting it to a fusing degree of heat, excluded from oxygen.

3. In the manufacture of carbid the herein-described process which consists in calcining limestone, mixing with the resultant lime before it cools to atmospheric temperature a carbonaceous material, and while the mixture is still heated mixing therewith calcium carbid, black oxid of manganese, bituminous coal, aluminium and chlorate of potash and finally subjecting the mass before it cools to a fusing degree of heat.

4. In the manufacture of carbid the herein-described process which consists in calcining limestone, mixing with the resultant lime before it cools to atmoshperic temperature, a carbonaceous material, and adding a superheating flux to the mass while still heated and finally subjecting the mass to a fusing degree of heat excluded from oxygen.

5. In the manufacture of carbid from limestone and carbonaceous material, the herein-described process which consists in calcining the limestone to produce lime, then after the lime is produced, and while the lime is still heated above atmospheric temperature, introducing thereinto carbonaceous material and mixing the same therewith, and while the mixture is still heated, raising its temperature to a fusing degree of heat.

In testimony whereof I have hereunto signed my name, in the presence of two witnesses, this 5th day of May, 1906.

HERMAN L. HARTENSTEIN.

Witnesses:
JAY C. UPTON,
BERTRAM B. BUTCHER.